US012812659B2

(12) United States Patent
Liu et al.

(10) Patent No.: US 12,812,659 B2
(45) Date of Patent: Nov. 24, 2026

(54) OVERBOOKING HANDLING FOR A MULTI-STAGE DOWNLINK CONTROL INFORMATION (DCI) TRANSMISSION

(71) Applicant: QUALCOMM Incorporated, San Diego, CA (US)

(72) Inventors: Le Liu, San Jose, CA (US); Huilin Xu, Temecula, CA (US); Gabi Sarkis, San Diego, CA (US)

( * ) Notice: Subject to any disclaimer, the term of this patent is extended or adjusted under 35 U.S.C. 154(b) by 363 days.

(21) Appl. No.: 18/605,989

(22) Filed: Mar. 15, 2024

(65) Prior Publication Data

US 2025/0294577 A1 Sep. 18, 2025

(51) Int. Cl.
*H04L 12/00* (2006.01)
*H04L 1/00* (2006.01)
*H04W 72/232* (2023.01)

(52) U.S. Cl.
CPC ......... *H04W 72/232* (2023.01); *H04L 1/0038* (2013.01)

(58) Field of Classification Search
CPC ............... H04W 72/232; H04W 76/28; H04W 72/0446; H04W 72/23; H04L 1/0038; H04L 5/0044; H04L 5/0078; H04L 1/0025; H04B 7/063
USPC .......................................................... 370/329
See application file for complete search history.

(56) References Cited

U.S. PATENT DOCUMENTS

2011/0085458 A1* 4/2011 Montojo ............... H04L 5/0078 370/252
2019/0306838 A1* 10/2019 Hui ....................... H04W 72/23
2020/0177254 A1* 6/2020 Lee ........................ H04B 7/063
2022/0303957 A1* 9/2022 Elshafie ................ H04L 1/0025
2023/0116687 A1* 4/2023 Zewail .................. H04L 5/0044 370/329
2023/0128411 A1* 4/2023 Lee ..................... H04W 72/232 370/329
2025/0096973 A1* 3/2025 Newman ........... H04W 72/0446
2025/0227717 A1* 7/2025 Liu ....................... H04W 76/28

FOREIGN PATENT DOCUMENTS

EP 3751776 A1 * 12/2020 ............ H04W 72/23
WO WO-2018127771 A1 * 7/2018 ............ H04W 72/23

* cited by examiner

*Primary Examiner* — Frantz Coby

(57) ABSTRACT

An apparatus for wireless communication by a user equipment (UE) includes a transmitter and a receiver. The receiver is configured to receive a first downlink control information (DCI) message associated with a first stage of a multi-stage DCI transmission and to receive a second DCI message associated with a second stage of the multi-stage DCI transmission. The multi-stage DCI transmission is associated with an overbooking restriction indicating a maximum quantity of blind decode operations associated with one or more stages of the multi-stage DCI transmission.

20 Claims, 6 Drawing Sheets

OVERBOOKING HANDLING FOR A MULTI-STAGE DOWNLINK CONTROL INFORMATION (DCI) TRANSMISSION

TECHNICAL FIELD

Aspects of the present disclosure relate generally to wireless communication systems, and more particularly, to overbooking handling for a multi-stage downlink control information (DCI) transmission within a wireless communication system.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

In some aspects of the disclosure, an apparatus for wireless communication by a user equipment (UE) includes a transmitter and a receiver. The receiver is configured to receive a first downlink control information (DCI) message associated with a first stage of a multi-stage DCI transmission and to receive a second DCI message associated with a second stage of the multi-stage DCI transmission. The multi-stage DCI transmission is associated with an overbooking restriction indicating a maximum quantity of blind decode operations associated with one or more stages of the multi-stage DCI transmission.

In some other aspects, a method of wireless communication by a user equipment (UE) includes receiving a first downlink control information (DCI) message associated with a first stage of a multi-stage DCI transmission. The method further includes receiving a second DCI message associated with a second stage of the multi-stage DCI transmission. The multi-stage DCI transmission is associated with an overbooking restriction indicating a maximum quantity of blind decode operations associated with one or more stages of the multi-stage DCI transmission.

In some other aspects, an apparatus for wireless communication by a network node includes a receiver and a transmitter. The transmitter is configured to transmit a first downlink control information (DCI) message associated with a first stage of a multi-stage DCI transmission and to transmit a second DCI message associated with a second stage of the multi-stage DCI transmission. The multi-stage DCI transmission is associated with an overbooking restriction indicating a maximum quantity of blind decode operations associated with one or more stages of the multi-stage DCI transmission.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

Like reference numbers and designations in the various drawings indicate like elements.

DETAILED DESCRIPTION

Figure 1:
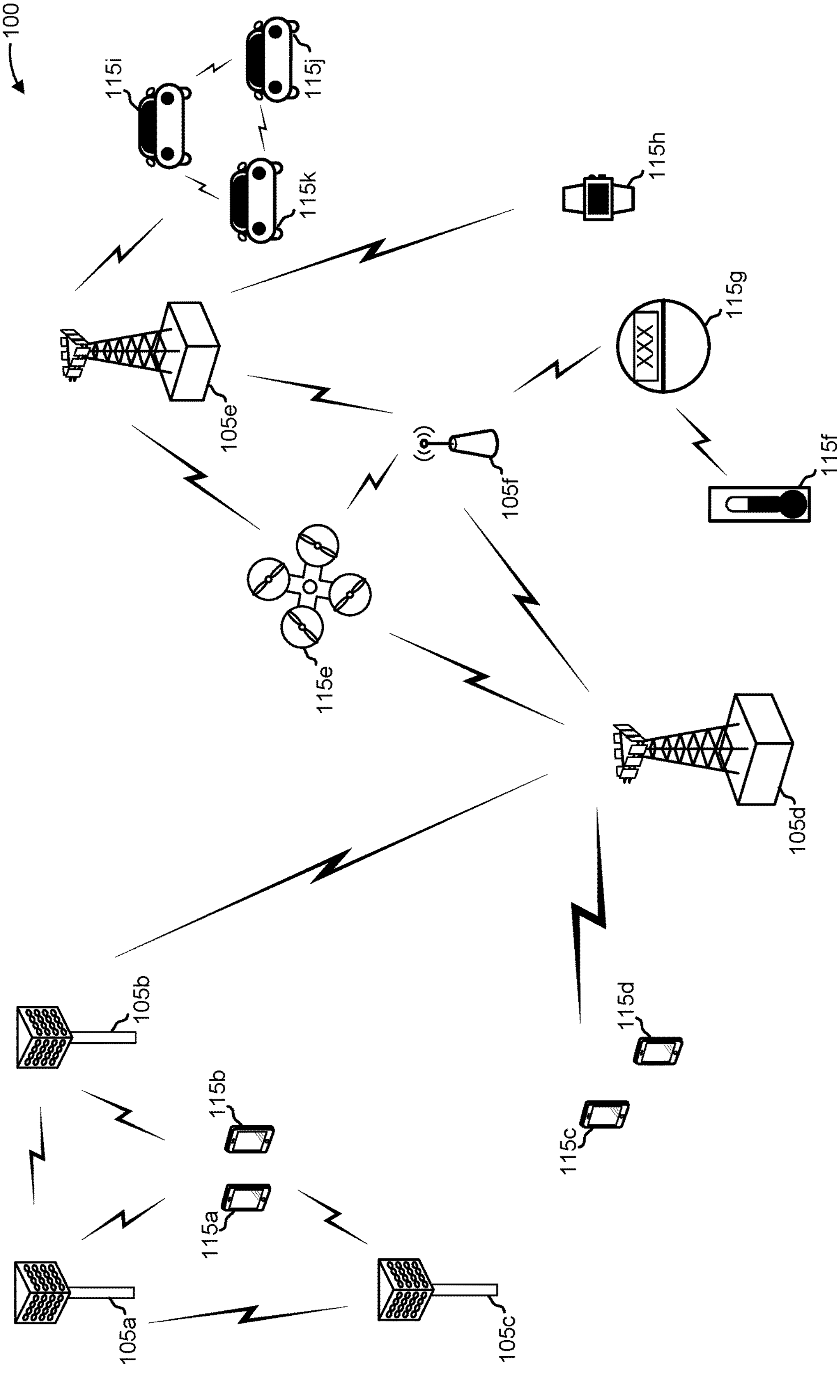
FIG. 1 is a block diagram illustrating details of an example wireless communication system that supports overbooking handling for a multi-stage downlink control information (DCI) transmission according to one or more aspects.

Wireless communication systems may use downlink control information (DCI) to signal control parameters and other information. For example, a network node (such as a base station) may transmit a DCI message to a user equipment (UE) to indicate scheduling information, uplink power control information, assignment of wireless resources, and other information. In a single-stage DCI (sDCI) transmission, one DCI message may be used to signal such information to the UE. In a multi-stage DCI transmission, multiple DCI messages may be used to signal such information to the UE.

Monitoring for DCI messages may be associated with increased power consumption and reduced performance within a wireless communication system. For example, to receive a DCI message, a UE may monitor a search space, which may include (or which may be referred to as) blind decode operations. Such blind decode operations consume power without necessarily resulting in a decoded DCI message. Further, performing such blind decode operations may reduce the ability of the UE to monitor for other messages, such as paging or other signaling. As a result, some wireless communication systems may avoid the use of multi-stage DCI transmissions, may limit the quantity of blind decode operations performed by a UE, or both.

To illustrate, a wireless communication system may impose a limit on the quantity of blind decode operations performed by a UE to search for an sDCI transmission. Such a limit may be specified by (or may be referred to as) an overbooking restriction. In such examples, the UE may not exceed the limit for an sDCI search (e.g., the UE may not "overbook" the sDCI search). In some circumstances, such a technique may be difficult to implement in connection with a multi-stage DCI transmission. For example, the network node and the UE may not "agree" on whether the limit is applicable to one stage of a multi-stage DCI transmission or to multiple stages of the multi-stage DCI transmission. Further, supporting both sDCI transmissions and multi-stage DCI transmissions in a wireless communication system may be difficult, such as if sDCI transmissions and multi-stage DCI transmissions use a common search space. As a result, sDCI signaling processes may be implemented more often as compared to multi-stage DCI signaling processes.

In some aspects of the disclosure, techniques are disclosed that may simplify operation associated with a multi-stage DCI transmission in a wireless communication system. In some examples, a multi-stage DCI transmission is associated with an overbooking restriction indicating a maximum quantity of blind decode operations. In some examples, the maximum quantity is applicable to a first stage of the multi-stage DCI transmission and is inapplicable to a second stage of the multi-stage DCI transmission. In some other examples, the maximum quantity is jointly applicable to the first stage and the second stage. In some further examples, the maximum quantity is separately applicable to the first stage and the second stage.

Alternatively, or in addition, some aspects of the disclosure may reduce a quantity of blind detection operations associated with a particular stage of a multi-stage DCI transmission. For example, a first DCI message associated with a first stage of the multi-stage DCI transmission may include scheduling information that schedules a second stage of the multi-stage DCI transmission. As a result, a UE may receive a second DCI message during the second stage based on the scheduling information (and without searching "empty" wireless resources during the second stage).

Alternatively, or in addition, some aspects of the disclosure may reduce or avoid conflicts between DCI transmissions (or DCI transmission stages). To illustrate, a conflict may occur if a first stage of a multi-stage DCI transmission and an sDCI transmission use one or more common wireless resources. As a result, in some scenarios, the first stage of the multi-stage DCI transmission may be "dropped" due to the sDCI transmission, which may also interrupt the second stage of the multi-stage DCI transmission (e.g., where a first DCI message of the first stage schedules a second DCI message of the second stage). In some aspects, the first stage may be associated with a greater priority as compared to the sDCI transmission. In some other aspects, the maximum quantity of blind decode operations may be increased for the second stage, such as by "borrowing" one or more blind decode operations from an empty component carrier (CC) in order to increase the maximum quantity (in order to increase the likelihood of receiving the second DCI message even in cases where the first DCI message is "dropped"). Accordingly, instances of "missing" the second stage of the multi-stage DCI transmission due to a conflict with an sDCI transmission may be reduced or avoided.

By facilitating multi-stage DCI transmissions in accordance with one or more aspects described herein, performance of a wireless communication system may be improved. For example, by using a first stage of a multi-stage DCI transmission to schedule a second stage of the multi-stage DCI transmission, latency may be reduced. To illustrate, a network node may schedule downlink resources for the second stage prior to receiving an acknowledgement (ACK) or negative-acknowledgement (NACK) for the first stage, and a UE may initiate reference signal (RS) processing and channel estimation associated with the second stage prior to receiving DCI of the second stage. Alternatively, or in addition, the UE may initiate uplink transmission processing associated with the second stage using scheduling information received during the first stage. As another example, a common DCI size may be used for different DCI stages or DCI formats, reducing complexity. As another example, the first stage may provide scheduling information for multiple different transmissions, and the second stage may provide link adaption scheduling information (e.g., a "refinement" of scheduling provided by the first stage). As an additional example, the first stage may be transmitted using one or more of a wider beam or a greater spectral efficiency as compared to the second stage, which may reduce power consumption or increase efficiency. Other examples are also within the scope of the disclosure.

To further illustrate, some aspects of the disclosure relate to wireless communication networks including code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS, LTE, and NR are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km^2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mm Wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements, etc. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, aggregated or dis-aggregated deployments, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with one or more UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water meter, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs **115*a*-115*d* of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100**.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations **105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d***. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such as UE **115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*e***.

Figure 2:
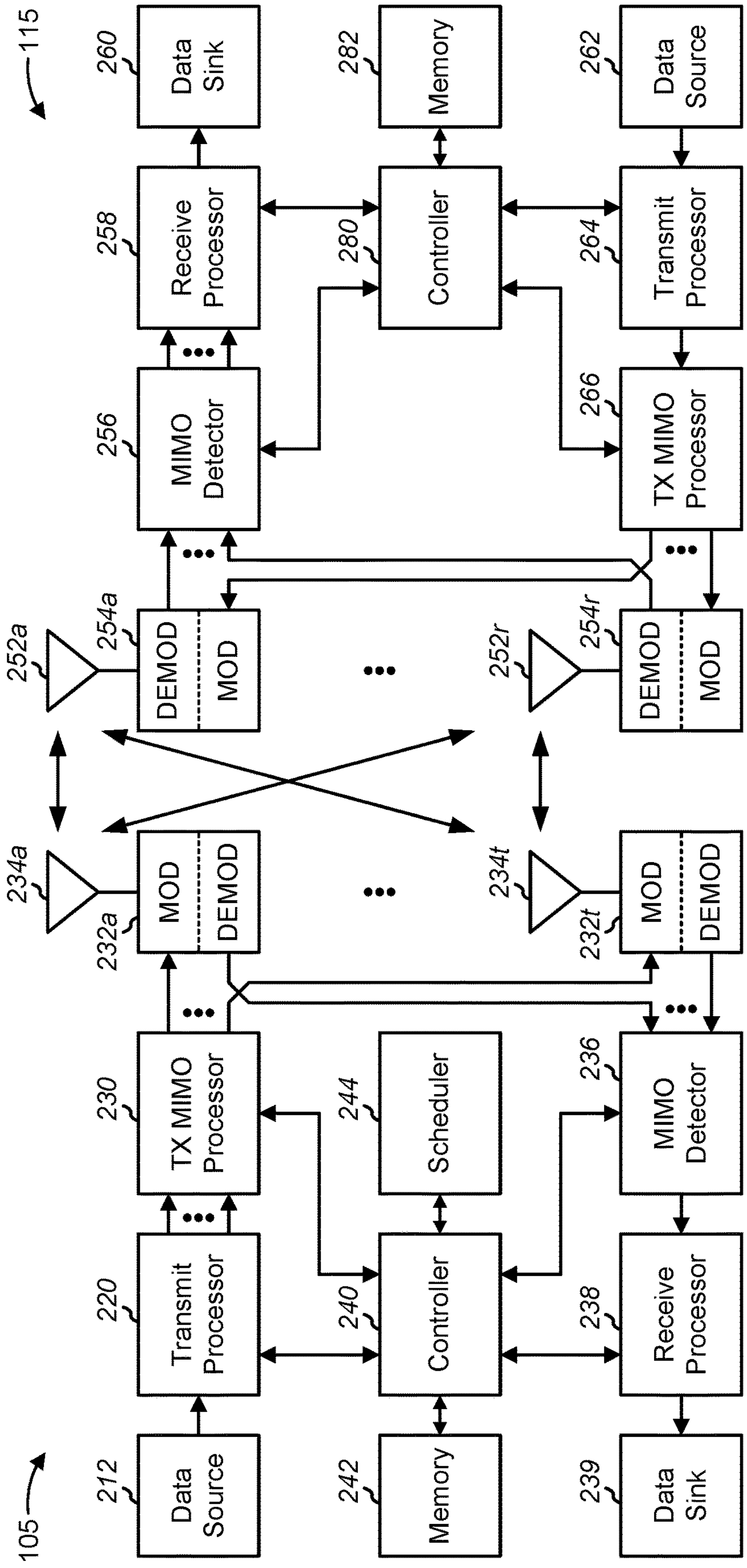
FIG. 2 is a block diagram illustrating examples of a base station and a user equipment (UE) that support overbooking handling for a multi-stage DCI transmission according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station **105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r*** for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240. Controllers 240 and 280 may direct the operation at base station 105 and UE 115, respectively. Controller 240 or other processors and modules at base station 105 or controller 280 or other processors and modules at UE 115 may initiate, perform, or control one or more operations described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
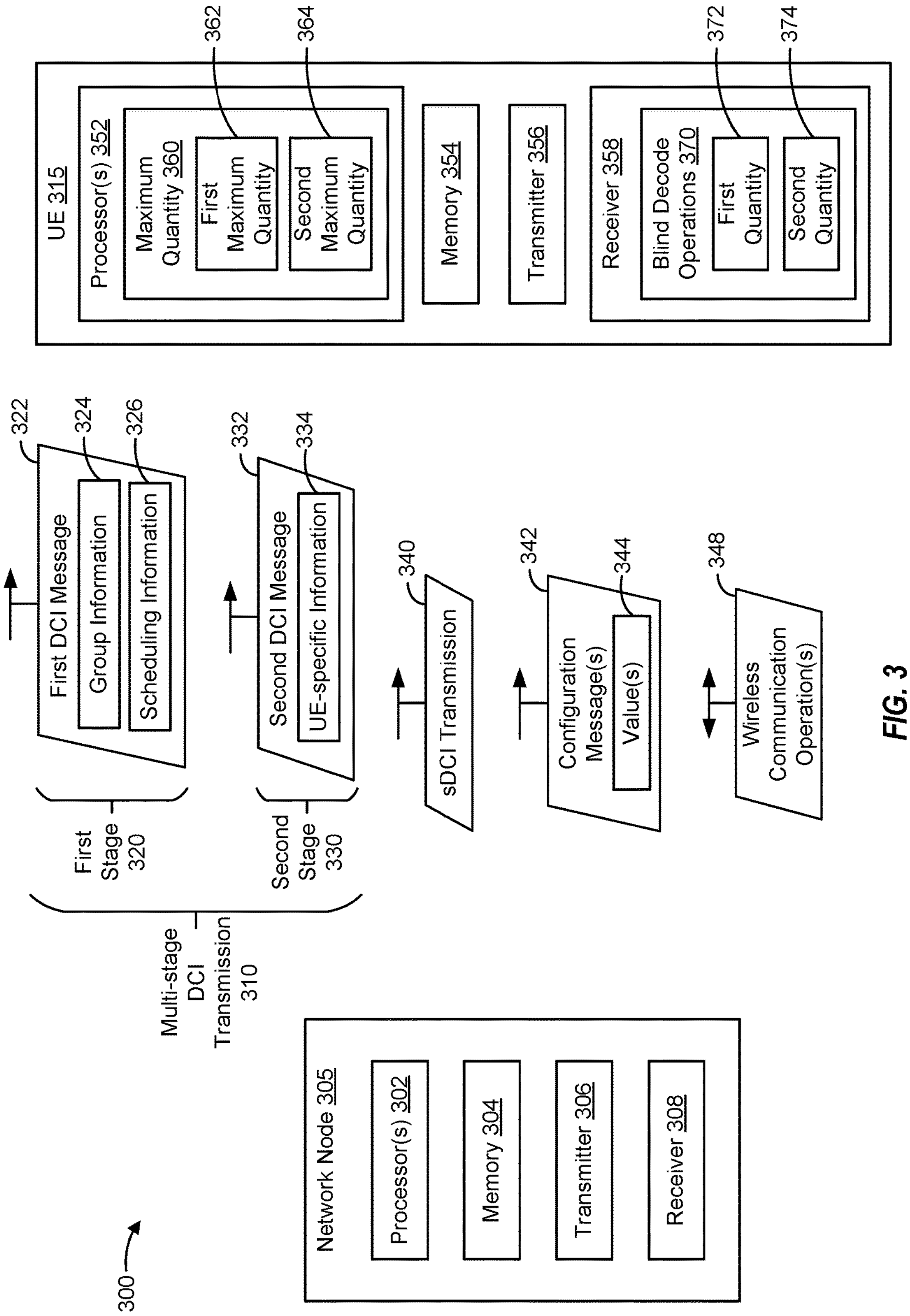
FIG. 3 is a block diagram illustrating an example wireless communication system that supports overbooking handling for a multi-stage DCI transmission according to one or more aspects.

FIG. 3 is a block diagram illustrating an example wireless communication system 300 that supports overbooking handling for a multi-stage DCI transmission according to some aspects. The wireless communication system 300 may include a UE 315 (such as the UE 115). The wireless communication system 300 may also include one or more network nodes, such as a network node 305. In some examples, the network node 305 may be implemented as a base station, such as the base station 105. To further illustrate, the network node 305 may be implemented as a base station, a network controller, an integrated access and backhauling (IAB) node, a distributed unit (DU), a central unit (CU), or a remote/radio unit (RU) (which may also be referred to as a remote radio unit (RRU)), as illustrative examples. A network node may also be referred to as a network entity or network device.

The network node 305 may include one or more processors 302 (such as the controller 240), a memory 304 (such as the memory 242), a transmitter 306, and a receiver 308. The one or more processors 302 may be coupled to the memory 304, to the transmitter 306, and to the receiver 308. In some examples, the transmitter 306 and the receiver 308 may include one or more components described with reference to FIG. 2, such as one or more of the modulator/demodulators 232*a-t*, the MIMO detector 236, the receive processor 238, the transmit processor 220, or the TX MIMO processor 230. In some examples, the one or more processors 302 may be configured to individually or collectively perform one or more operations described herein.

The transmitter 306 may transmit reference signals, synchronization signals, control information, and data to one or more other devices, and the receiver 308 may receive reference signals, control information, and data from one or more other devices. For example, in some implementations, the transmitter 306 may transmit signaling, control information, and data to the UE 315, and the receiver 308 may receive signaling, control information, and data from the UE 315.

The UE 315 may include one or more processors 352 (such as the controller 280), a memory 354 (such as the memory 282), a transmitter 356, and a receiver 358. The one or more processors 352 may be coupled to the memory 354, to the transmitter 356, and to the receiver 358. In some examples, the transmitter 356 and the receiver 358 may include one or more components described with reference to FIG. 2, such as one or more of the modulator/demodulators 254*a-r*, the MIMO detector 256, the receive processor 258, the transmit processor 264, or the TX MIMO processor 266. In some implementations, the transmitter 356 and the receiver 358 may be integrated in one or more transceivers of the UE 315. In some examples, the one or more processors 352 may be configured to individually or collectively perform one or more operations described herein.

The transmitter 356 may transmit reference signals, synchronization signals, control information, and data to one or more other devices, and the receiver 358 may receive reference signals, control information, and data from one or more other devices. For example, in some implementations, the transmitter 356 may transmit signaling, control information, and data to the network node 305, and the receiver 358 may receive signaling, control information, and data from the network node 305.

The wireless communication system 300 may use wireless communication channels, which may be specified by one or more wireless communication protocols, such as a 5G NR wireless communication protocol. To illustrate, the network node 305 may communicate with the UE 315 using one or more downlink wireless communication channels (such as via one or more of a PDSCH or a PDCCH). The UE 315 may communicate with the network node 305 using one or more uplink wireless communication channels (such as via one or more of a PUSCH or a PUCCH). Alternatively, or in addition, the UE 315 may communicate with one or more other UEs, such as via a sidelink wireless communication channel.

During operation, the UE 315 may receive DCI from one or more network nodes, such as the network node 305. Such DCI may indicate parameters such as scheduling information (e.g., one or more of downlink scheduling information, uplink scheduling information, or sidelink scheduling information), uplink power control information, assignment of wireless resources, and other information.

In some aspects of the disclosure, the wireless communication system 300 may support multi-stage DCI transmissions, such as a multi-stage DCI transmission 310. A multi-stage DCI transmission may include transmission of multiple different DCI messages over multiple different stages. For example, during the multi-stage DCI transmission 310, the network node 305 may transmit a first DCI message 322 during a first stage 320 of the multi-stage DCI transmission 310 and may transmit a second DCI message 332 during a second stage 330 of the multi-stage DCI transmission 310. The second stage 330 may occur after the first stage 320. For example, the first stage 320 may occupy one or more first time slots, and the second stage 330 may occupy one or more second time slots subsequent to the one or more first time slots. In some examples, the multi-stage DCI transmission 310 may correspond to a two-stage DCI transmission.

In some examples, the first DCI message 322 and the second DCI message 332 may include scheduling information. To illustrate, the first DCI message 322 may include group information 324 associated with multiple UEs (which may include the UE 315), and the second DCI message 332 may include UE-specific information 334 that is specific to the UE 315. In some examples, the first DCI message 322 may include scheduling information 326 associated with the second DCI message 332.

In some aspects, a UE may receive DCI by searching wireless resources for the DCI. For example, the UE 315 may search a set of wireless resources (such as PDCCH resources) to monitor for the multi-stage DCI transmission 310. The set of candidate resources may include or may be referred to as a search space, candidates, or candidate resources. The search may include or may be referred to as a blind decode operation.

Further, in examples, a DCI transmission may be subject to an overbooking restriction that indicates a limit on searching associated with the DCI transmission. The limit may be specified by a wireless communication protocol associated with the wireless communication system 300 or may be configured by the network node 305. In some examples, imposing such a limit on searching associated with a DCI transmission may ensure or increase likelihood that the UE 315 is able to receive other signaling, such as paging messages or other information.

To illustrate, the multi-stage DCI transmission 310 may be associated with a maximum quantity 360 of blind decode operations 370 performed by the UE 315 to search for the multi-stage DCI transmission 310. In some examples, the maximum quantity 360 may be imposed on some stages, but not all stages, of the multi-stage DCI transmission 310. In some other examples, the maximum quantity 360 may be jointly imposed on all stages of the multi-stage DCI transmission 310. In some other examples, the maximum quantity 360 may be separately imposed on each stage of the multi-stage DCI transmission 310.

To further illustrate, in some examples, the maximum quantity 360 may be applicable to the first stage 320 and may be inapplicable to the second stage 330. For example, in some implementations, the UE 315 may not perform any of the blind decode operations 370 during the second stage 330, such as if no search space is configured for the second stage 330, or if the first DCI message 322 indicates how the UE 315 is to receive the second DCI message 332 (e.g., by identifying a PDCCH occasion, an aggregation layer (AL), or other information that may enable the UE 315 to avoid blind detection of PDCCH candidates during the second stage 330). In such examples, the UE 315 may receive the first DCI message 322 using a first quantity 372 of the blind decode operations 370 that is less than or equal to the maximum quantity 360. In such examples, the UE 315 may receive the second DCI message 332 using a second quantity of the blind decode operations 370 that is less than, equal to, or greater than the maximum quantity 360 (e.g., where the second quantity may be zero).

In some other examples, the maximum quantity 360 may be jointly applicable to the first stage 320 and to the second stage 330. In some such examples, the maximum quantity 360 may be based on a first maximum quantity 362 of the blind decode operations 370 associated with the first stage 320 and may be further based on a second maximum quantity 364 of the blind decode operations 370 associated with the second stage 330 (e.g., where the maximum quantity 360 corresponds to a sum of the first maximum quantity 362 or the second maximum quantity 364). In such examples, the first quantity 372 of the blind decode operations 370 may be less than or equal to a first maximum quantity 362, and the second quantity 374 of the blind decode operations 370 may be less than or equal to the second maximum quantity 364. To further illustrate, a search space may be configured for the second stage 330, and the second DCI message 332 may be transmitted via a PDCCH using a quantity of candidates that may be based on information indicated by RRC signaling or by the first DCI message 322. The candidates may be counted toward the maximum quantity 360. The search space may have a search space type and a search space set ID to jointly set a priority for the first stage 320 and the second stage 330. In such examples, the UE 315 may expect a common search space type and search set ID to be configured for the first stage 320 and the second stage 330.

In some additional examples, the maximum quantity 360 may be separately applicable to the first stage 320 and to the second stage 330. In such examples, the first quantity 372 of the blind decode operations 370 may be less than or equal to the maximum quantity 360, and the second quantity 374 of the blind decode operations 370 may be less than or equal to the maximum quantity 360. To further illustrate, a search space may be configured for the second stage 330, and the second DCI message 332 may be transmitted via a PDCCH using a quantity of candidates that may be based on information indicated by RRC signaling or by the first DCI message 322. The candidates may be counted toward the maximum quantity 360. In some examples, a search space ID may be lower for the first stage 320 as compared to the second stage 330 so that the first stage 320 has higher priority than the second stage 330. In an example, the first stage 320 may be configured with a common search space (CSS), such as a type-three (Type3-CSS), and the second stage 330 may be configured with a UE search space (USS). In some examples, the CSS may have a lower search space ID as compared to the USS. In another example, the first stage 320 may be configured with a USS, and the second stage 330 may be configured with a USS having a greater search space ID as compared to the first stage 320.

In some scenarios, a conflict may arise between stages or between DCI transmissions. To illustrate, in some implementations, the wireless communication system 300 may support both multi-stage DCI transmissions and single-stage DCI (sDCI) transmissions, such as an sDCI transmission 340. For example, in some implementations, the UE 315 may support both multi-stage DCI transmissions and sDCI transmissions. One or more other UEs may support sDCI transmissions but not multi-stage DCI transmissions. Further, in some implementations, an sDCI transmission (such as the sDCI transmission 340) may use one or more common wireless resources as at least one stage of multi-stage DCI transmission (such as the first stage 320 of the multi-stage DCI transmission 310). As a result, in some scenarios, a conflict may arise between at least one stage of a multi-stage DCI transmission and an sDCI transmission, which may cause the at least one stage to be "dropped." Further, if the at least one stage includes scheduling information associated with a subsequent stage of the multi-stage DCI transmission (such as the scheduling information 326 associated with the second stage 330), then reception associated with the subsequent stage may be disrupted.

In some aspects of the disclosure, priorities may be associated with different DCI transmissions (or DCI transmission stages) to reduce or avoid instances of a dropped DCI stage due to a conflict between the different DCI transmissions (or DCI transmission stages). To illustrate, one or more of the first stage 320 may be associated with a first priority, and the sDCI transmission 340 may be associated with a second priority that is less than the first priority. In some examples, a search space type for the first stage 320 may be different than a search space type associated with the sDCI transmission 340. For example, for UE-specific data scheduling, a specific search space type for the first stage 320 may have higher priority than the Type3-CSS or USS for sDCI scheduling. As a result, dropping of the first stage 320 due to a conflict with the sDCI transmission 340 may be avoided.

In another example, at least some candidate blind decode operations may be "borrowed" from an unscheduled component carrier (CC) to increase the maximum quantity 360 of the blind decode operations 370 available for a scheduled CC (e.g., while keeping the overall maximum quantity of blind decode operations for the CCs the same). To illustrate, the maximum quantity 360 may be less than or equal to a sum of a plurality of maximum quantities respectively associated with a plurality of CCs associated with the multi-stage DCI transmission 310. At least one CC of the plurality of CCs may be unscheduled for wireless communication associated with the UE 315 during the multi-stage DCI transmission 310, and the maximum quantity 360 may be based at least in part on one or more blind decode operations associated with the at least one CC (e.g., by "borrowing" the one or more blind decode operations from the at least one CC). In such examples, if the plurality of CCs is allocated a quantity of N blind decode operations (where N indicates a positive integer greater than one), then x blind decode operations may be borrowed from the at least one CC and added to y blind decode operations associated with another CC, where $x>0$, $y>0$, and $x+y\leq N$. In such examples, the maximum quantity 360 may correspond to y.

In some implementations, one or more parameters described herein may be specified by a wireless communication protocol, may be configured by the network node 305, or both. To illustrate, the network node 305 may transmit one or more configuration messages 342 to the UE 315 indicating one or more values 344. The one or more values 344 may include, for example, one or more of the maximum quantity 360, the first maximum quantity 362, or the second maximum quantity 364. In some examples, the one or more configuration messages 342 may specify whether the maximum quantity 360 applies to one (but not both) of the stages 320, 330, whether the maximum quantity 360 jointly applies to the stages 320, 330, or whether the maximum quantity 360 separately applies to the stages 320, 330.

After receiving the multi-stage DCI transmission 310, the UE 315 may perform one or more wireless communication operations 348 in accordance with DCI indicated by the multi-stage DCI transmission 310. For example, performing the one or more wireless communication operations 348 may include transmitting or receiving one or more signals (such as a downlink signal, an uplink signal, or a sidelink signal) using resources specified by the DCI indicated by the multi-stage DCI transmission 310. Alternatively, or in addition, the UE 315 may perform the wireless communication operations 348 in accordance with power control information specified by the DCI indicated by the multi-stage DCI transmission 310. Other examples are also within the scope of the disclosure.

In some implementations, the maximum quantity 360 may apply to both the multi-stage DCI transmission 310 and to the sDCI transmission 340. In some other implementations, the maximum quantity 360 may apply to the multi-stage DCI transmission 310, and the sDCI transmission 340 may be associated with a different maximum quantity associated with another overbook restriction. Accordingly, the multi-stage DCI transmission 310 and the sDCI transmission 340 may be associated with the same overbooking restriction or with different respective overbooking restrictions.

In some examples, the first DCI message 322 may schedule the second stage 330 of the multi-stage DCI transmission 310. For example, the first DCI message 322 may include the scheduling information 326 associated with the second DCI message 332. In some such examples, the UE 315 may receive the second DCI message 332 without using any of the blind decode operations 370. Some such examples are described further with reference to FIG. 4.

Figure 4:
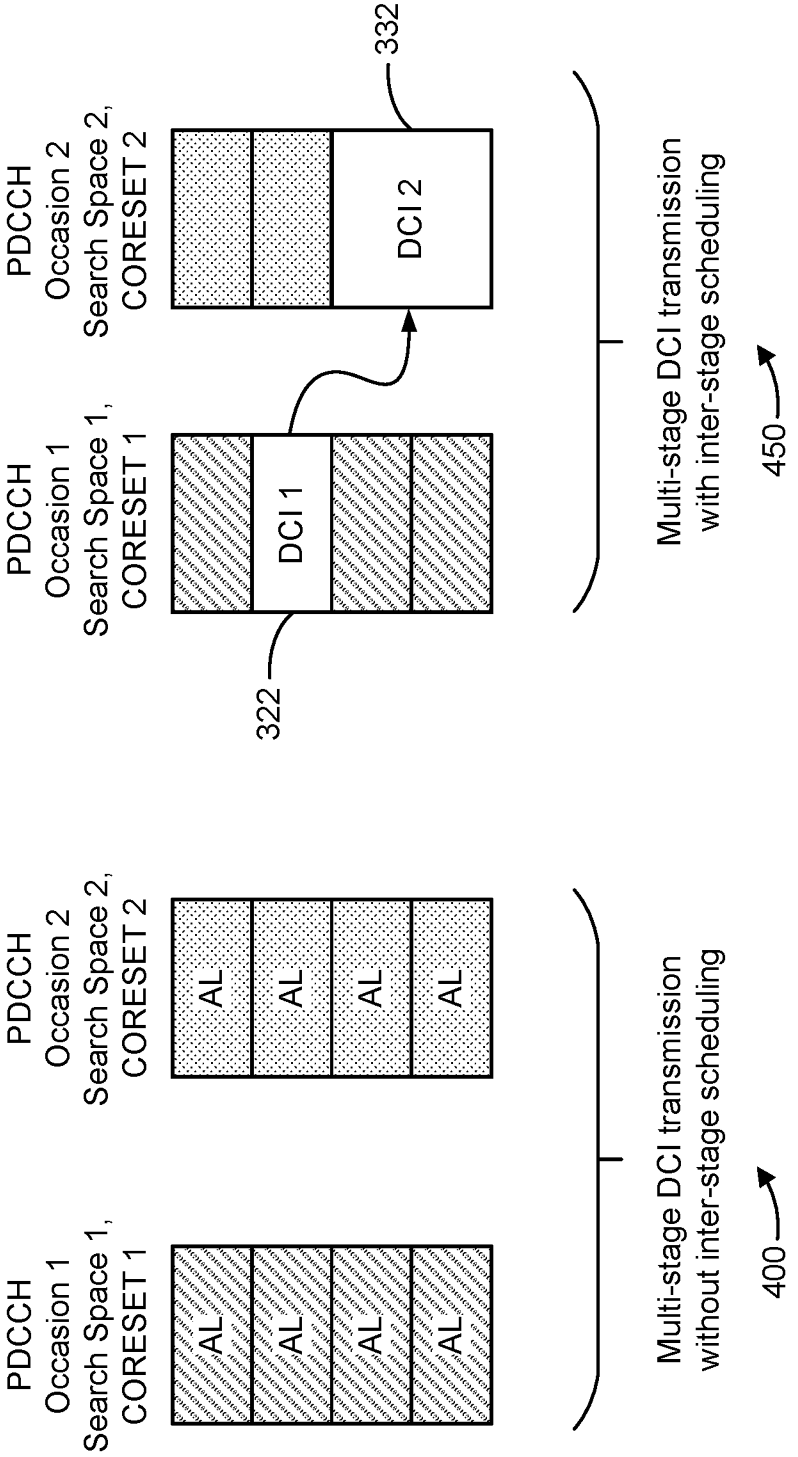
FIG. 4 is a block diagram illustrating examples of a multi-stage DCI transmission without inter-stage scheduling and a multi-stage DCI transmission with inter-stage scheduling that support overbooking handling according to some aspects.

FIG. 4 is a block diagram illustrating examples of a multi-stage DCI transmission 400 without inter-stage scheduling and a multi-stage DCI transmission 450 with inter-stage scheduling that support overbooking handling according to some aspects. In some examples, the multi-stage DCI transmission 310 of FIG. 3 may correspond to the multi-stage DCI transmission 400 or the multi-stage DCI transmission 450.

To receive the multi-stage DCI transmission 400, the UE 315 may perform a search during PDCCH occasion 1 using search space 1 and control resource set (CORESET) 1, which may be associated with one or more aggregation layers (AL). The UE 315 may also perform a search during PDCCH occasion 2 using search space 2 and CORESET 2.

To receive the multi-stage DCI transmission 450, the UE 315 may perform a search during PDCCH occasion 1 using search space 1 and CORESET 1. In the example of the multi-stage DCI transmission 450, the first DCI message 322 may schedule the second DCI message 332, such as by indicating the scheduling information 326. In an example, the scheduling information 326 may indicate the AL and CCE mapping location of the PDCCH for the second stage DCI during PDCCH occasion 2 using the search space 2 and CORESET 2. As a result, the UE 315 may count the number of PDCCH candidates for blind detection in PDCCH occasion 2 without counting a PDCCH candidate if it would use the CCEs colliding with that of the second stage DCI in the same CORESET 2. In FIG. 4, the PDCCH with AL-8 may be used to transmit the second stage DCI, where the CCEs in the lower part of the CORESET without interleaving may not be used to transmit another PDCCH. Therefore, the PDCCH candidates for blind decoding may not count those using the CCEs for the PDCCH of the second stage DCI.

Although some examples are described herein with reference to the blind decode operations 370, in some implementations, one or more other parameters may be subject to an overbooking restriction. For example, a quantity of control channel elements (CCEs) used by the UE 315 to search for DCI transmissions may be subject to a restriction. Examples described herein with reference to the blind decode operations 370 may be implemented using CCEs (e.g., by imposing a limit on the quantity of CCEs used by the UE 315) alternatively or in addition to implementing such examples using the blind decode operations 370.

One or more features described herein may improve performance of a wireless communication system, such as the wireless communication system 300. For example, by using the first stage 320 to schedule the second stage 330, latency may be reduced. To illustrate, the network node 305 may schedule downlink resources for the second stage 330 prior to receiving an acknowledgement (ACK) or negative-acknowledgement (NACK) for the first stage 320, and the UE 315 may initiate reference signal (RS) processing and channel estimation associated with the second stage 330 prior to receiving the second DCI message 332 of the second stage 330. Alternatively, or in addition, the UE 315 may initiate uplink transmission processing associated with the second stage 330 using scheduling information received during the first stage 320, such as the scheduling information 326. As another example, a common DCI size may be used for different DCI stages or DCI formats, reducing complexity. As another example, the first stage 320 may provide scheduling information 326 for multiple different transmissions, and the second stage 330 may provide link adaption scheduling information (e.g., a "refinement" of the scheduling information 326). As an additional example, the network node 305 may transmit the first DCI message 322 using one or more of a wider beam or a greater spectral efficiency as compared to the second DCI message 332, which may reduce power consumption or increase efficiency. Other examples are also within the scope of the disclosure.

Figure 5:
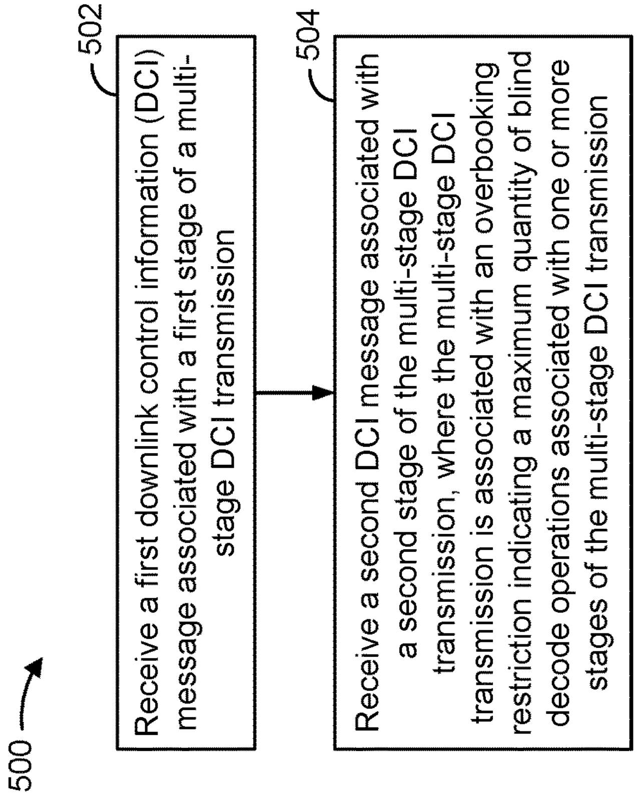
FIG. 5 is a flow diagram illustrating an example method that supports overbooking handling for a multi-stage DCI transmission according to one or more aspects.

FIG. 5 is a flow diagram illustrating an example method 500 that supports overbooking handling for a multi-stage DCI transmission according to one or more aspects. In some examples, the method 500 may be performed by a UE, such as the UE 115 or the UE 315.

The method 500 includes receiving a first downlink control information (DCI) message associated with a first stage of a multi-stage DCI transmission, at 502. For example, the UE 315 may receive the first DCI message 322 associated with the first stage 320 of the multi-stage DCI transmission 310.

The method 500 further includes receiving a second DCI message associated with a second stage of the multi-stage DCI transmission, at 504. The multi-stage DCI transmission is associated with an overbooking restriction indicating a maximum quantity of blind decode operations associated with one or more stages of the multi-stage DCI transmission. For example, the UE 315 may receive the second DCI message 332 associated with the second stage 330 of the multi-stage DCI transmission 310. The multi-stage DCI transmission 310 may be associated with an overbooking restriction indicating the maximum quantity 360 of the blind decode operations 370 associated with one or more stages of the multi-stage DCI transmission 310.

Figure 6:
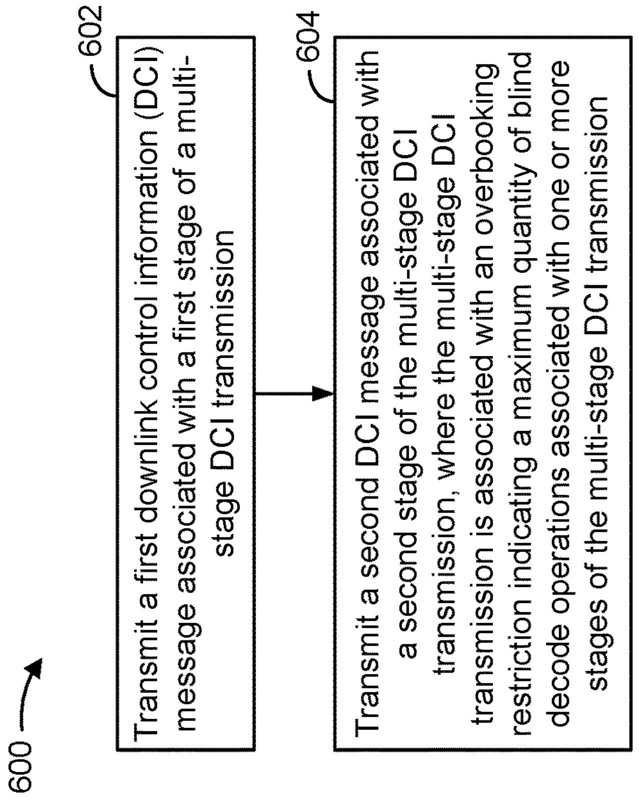
FIG. 6 is a flow diagram illustrating an example method that supports overbooking handling for a multi-stage DCI transmission according to one or more aspects.

FIG. 6 is a flow diagram illustrating an example method 600 that supports overbooking handling for a multi-stage DCI transmission according to one or more aspects. In some examples, the method 600 may be performed by a network node, such as the base station 105 or the network node 305.

The method 600 includes transmitting a first downlink control information (DCI) message associated with a first stage of a multi-stage DCI transmission, at 602. For example, the network node 305 may transmit the first DCI message 322 associated with the first stage 320 of the multi-stage DCI transmission 310.

The method 600 further includes transmitting a second DCI message associated with a second stage of the multi-stage DCI transmission, at 604. The multi-stage DCI transmission is associated with an overbooking restriction indicating a maximum quantity of blind decode operations associated with one or more stages of the multi-stage DCI transmission. For example, the network node 305 may transmit the second DCI message 332 associated with the second stage 330 of the multi-stage DCI transmission 310. The multi-stage DCI transmission 310 may be associated with an overbooking restriction indicating the maximum quantity 360 of the blind decode operations 370 associated with one or more stages of the multi-stage DCI transmission 310.

Figure 7:
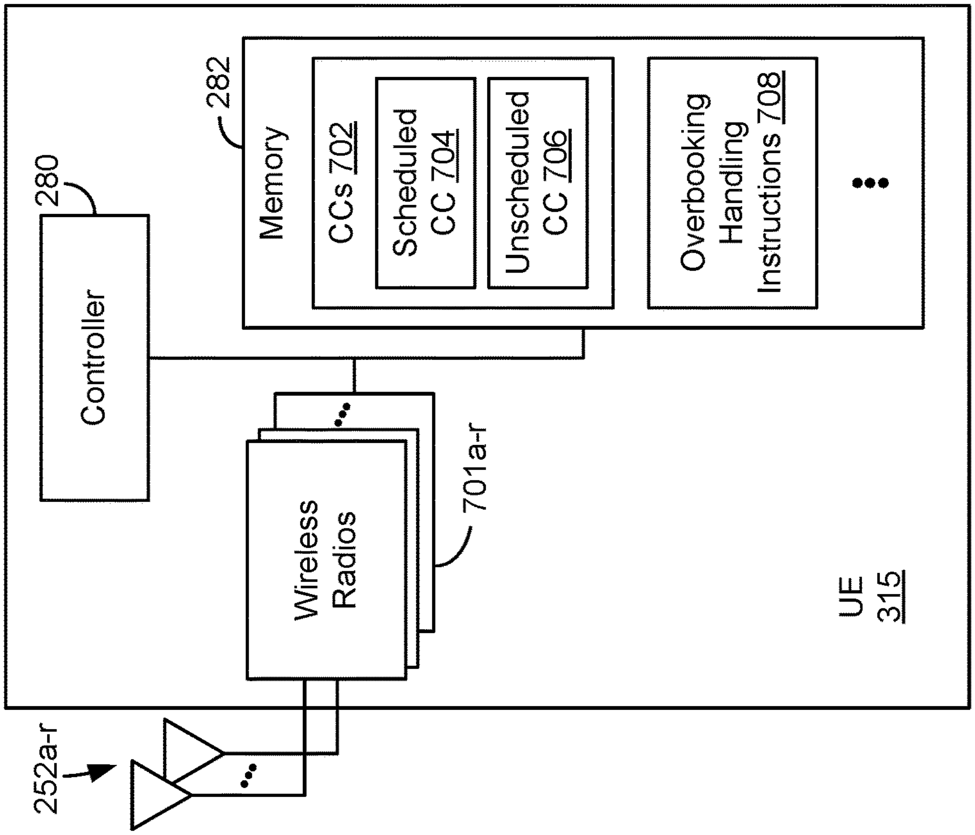
FIG. 7 is a block diagram of an example UE that supports overbooking handling for a multi-stage DCI transmission according to one or more aspects.

FIG. 7 is a block diagram of an example UE 315 that supports overbooking handling for a multi-stage DCI transmission according to one or more aspects. The UE 315 may include structure, hardware, or components illustrated in FIG. 2, FIG. 3, or both. For example, the UE 315 may include the controller 280, which may execute instructions stored in the memory 282. Using the controller 280, the UE 315 may transmit and receive signals via wireless radios 701*a-r* and antennas 252*a-r*. The wireless radios 701*a-r* may include one or more components or devices described herein, such as the modulator/demodulators 254*a-r*, the MIMO detector 256, the receive processor 258, the transmit processor 264, the TX MIMO processor 266, the transmitter 356, the receiver 358, one or more other components or devices, or a combination thereof.

In some examples, the UE 315 may include one or more memories (e.g., the memory 282) storing instructions executable by one or more processors (e.g., the controller 280) to initiate, perform, or control one or more operations described herein. For example, the memory 282 may store data or instructions indicating component carriers (CCs) 702. The CCs 702 may include a scheduled CC 704 and an unscheduled CC 706. In some examples, the UE 315 may "borrow" one or more blind decode operations from the unscheduled CC 706 to increase a maximum quantity of blind decode operations associated with the scheduled CC 704. As another example, the memory 282 may store overbooking handling instructions 708 executable by the controller 280 to perform the blind decode operations 370 in accordance with the maximum quantity 360 (e.g., without exceeding the maximum quantity 360).

Figure 8:
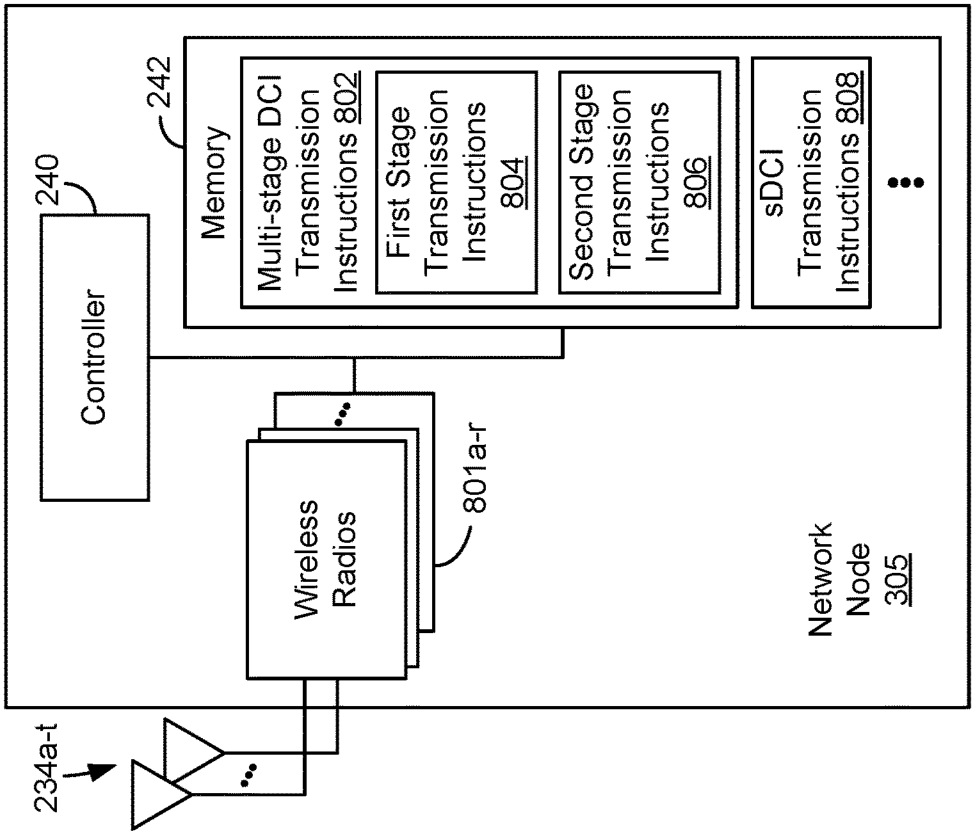
FIG. 8 is a block diagram of an example base station that supports overbooking handling for a multi-stage DCI transmission according to one or more aspects.

FIG. 8 is a block diagram of an example network node 305 that supports overbooking handling for a multi-stage DCI transmission according to one or more aspects. The network node 305 may include structure, hardware, and components illustrated in FIG. 2, FIG. 3, or both. For example, the network node 305 may include the controller 240, which may execute instructions stored in memory 242. Under control of the controller 240, the network node 305 may transmit and receive signals via wireless radios 801*a-t* and antennas 234*a-t*. The wireless radios 801*a-t* may include one or more components or devices described herein, such as the modulator/demodulators 232*a-t*, the MIMO detector 236, the receive processor 238, the transmit processor 220, the TX MIMO processor 230, one or more other components or devices, or a combination thereof.

In some examples, the network node 305 may include one or more memories (e.g., the memory 242) storing instructions executable by one or more processors (e.g., the controller 240) to initiate, perform, or control one or more operations described herein. For example, the memory 242 may store multi-stage DCI transmission instructions 802 executable the controller 240 to initiate, perform, or control the multi-stage DCI transmission 310. In some examples, the multi-stage DCI transmission instructions 802 may include first stage transmission instructions 804 executable by the controller 240 to initiate, perform, or control transmission of the first DCI message 322 and may further include second stage transmission instructions 806 executable by the controller 240 to initiate, perform, or control transmission of the second DCI message 332. In some implementations, the memory 242 may store sDCI transmission instructions 808 executable by the controller 240 to initiate, perform, or control the sDCI transmission 340.

In a first aspect, an apparatus for wireless communication by a user equipment (UE) includes a transmitter and a receiver. The receiver is configured to receive a first downlink control information (DCI) message associated with a first stage of a multi-stage DCI transmission and to receive a second DCI message associated with a second stage of the multi-stage DCI transmission. The multi-stage DCI transmission is associated with an overbooking restriction indicating a maximum quantity of blind decode operations associated with one or more stages of the multi-stage DCI transmission.

In a second aspect, in combination with the first aspect, the maximum quantity of the blind decode operations is applicable to the first stage and is inapplicable to the second stage, and the receiver is further configured to receive the first DCI message using a first quantity of the blind decode operations that is less than or equal to the maximum quantity.

In a third aspect, in combination with one or more of the first aspect or the second aspect, the maximum quantity is jointly applicable to the first stage and to the second stage, the receiver is further configured to receive the first DCI message using a first quantity of the blind decode operations that is less than or equal to a first maximum quantity and to receive the second DCI message using a second quantity of the blind decode operations that is less than or equal to a second maximum quantity, and the maximum quantity corresponds to a sum of the first quantity and the second quantity.

In a fourth aspect, in combination with one or more of the first aspect through the third aspect, the maximum quantity is separately applicable to the first stage and to the second stage, and the receiver is further configured to receive the first DCI message using a first quantity of the blind decode operations that is less than or equal to the maximum quantity and to receive the second DCI message using a second quantity of the blind decode operations that is less than or equal to the maximum quantity.

In a fifth aspect, in combination with one or more of the first aspect through the fourth aspect, the first stage of the multi-stage DCI transmission is associated with a first priority that is greater than a second priority associated with a single-stage DCI (sDCI) transmission.

In a sixth aspect, in combination with one or more of the first aspect through the fifth aspect, the maximum quantity is less than or equal to a sum of a plurality of maximum quantities respectively associated with a plurality of component carriers (CCs) associated with the multi-stage DCI transmission.

In a seventh aspect, in combination with one or more of the first aspect through the sixth aspect, at least one CC of the plurality of CCs is unscheduled for wireless communication associated with the UE during the multi-stage DCI transmission, and the maximum quantity is based at least in part on one or more blind decode operations associated with the at least one CC.

In an eighth aspect, in combination with one or more of the first aspect through the seventh aspect, the first DCI message indicates scheduling information associated with the second DCI message, and the receiver is further configured to receive the second DCI message using the scheduling information and a physical downlink control channel (PDCCH) candidate without counting control channel elements (CCEs) of the PDCCH candidate toward the maximum quantity.

In a ninth aspect, a method of wireless communication by a user equipment (UE) includes receiving a first downlink control information (DCI) message associated with a first stage of a multi-stage DCI transmission. The method further includes receiving a second DCI message associated with a second stage of the multi-stage DCI transmission. The multi-stage DCI transmission is associated with an overbooking restriction indicating a maximum quantity of blind decode operations associated with one or more stages of the multi-stage DCI transmission.

In a tenth aspect, in combination with the ninth aspect, the maximum quantity of the blind decode operations is applicable to the first stage and is inapplicable to the second stage, and the first DCI message is received using a first quantity of the blind decode operations that is less than or equal to the maximum quantity.

In an eleventh aspect, in combination with one or more of the ninth aspect through the tenth aspect, the maximum quantity is jointly applicable to the first stage and to the second stage, the first DCI message is received using a first quantity of the blind decode operations that is less than or equal to a first maximum quantity, the second DCI message is received using a second quantity of the blind decode operations that is less than or equal to a second maximum quantity, and the maximum quantity corresponds to a sum of the first quantity and the second quantity.

In a twelfth aspect, in combination with one or more of the ninth aspect through the eleventh aspect, the maximum quantity is separately applicable to the first stage and to the second stage, the first DCI message is received using a first quantity of the blind decode operations that is less than or equal to the maximum quantity, and the second DCI message is received using a second quantity of the blind decode operations that is less than or equal to the maximum quantity.

In a thirteenth aspect, in combination with one or more of the ninth aspect through the twelfth aspect, the first stage of the multi-stage DCI transmission is associated with a first priority that is greater than a second priority associated with a single-stage DCI (sDCI) transmission.

In a fourteenth aspect, in combination with one or more of the ninth aspect through the thirteenth aspect, the maximum quantity is less than or equal to a sum of a plurality of maximum quantities respectively associated with a plurality of component carriers (CCs) associated with the multi-stage DCI transmission.

In a fifteenth aspect, in combination with one or more of the ninth aspect through the fourteenth aspect, at least one CC of the plurality of CCs is unscheduled for wireless communication associated with the UE during the multi-stage DCI transmission, and the maximum quantity is based at least in part on one or more blind decode operations associated with the at least one CC.

In a sixteenth aspect, in combination with one or more of the ninth aspect through the fifteenth aspect, the first DCI message indicates scheduling information associated with the second DCI message, and the second DCI message is received using the scheduling information and a physical downlink control channel (PDCCH) candidate without counting control channel elements (CCEs) of the PDCCH candidate toward the maximum quantity.

In a seventeenth aspect, an apparatus for wireless communication by a network node includes a receiver and a transmitter. The transmitter is configured to transmit a first downlink control information (DCI) message associated with a first stage of a multi-stage DCI transmission and to transmit a second DCI message associated with a second stage of the multi-stage DCI transmission. The multi-stage DCI transmission is associated with an overbooking restriction indicating a maximum quantity of blind decode operations associated with one or more stages of the multi-stage DCI transmission.

In an eighteenth aspect, in combination with the seventeenth aspect, the maximum quantity of the blind decode operations is applicable to the first stage and is inapplicable to the second stage.

In a nineteenth aspect, in combination with one or more of the seventeenth aspect through the eighteenth aspect, the maximum quantity is jointly applicable to the first stage and to the second stage.

In a twentieth aspect, in combination with one or more of the seventeenth aspect through the nineteenth aspect, the maximum quantity is separately applicable to the first stage and to the second stage.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more components, functional blocks, and modules described herein may include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via processor circuitry, via executable instructions, or combinations thereof.

Those of skill would further appreciate that the various illustrative logical blocks, modules, circuits, and operations described herein may be implemented as electronic hardware, computer software, or combinations of both. To illustrate, various illustrative components, blocks, modules, circuits, and operations may be described generally. Whether such functionality is implemented as hardware or software may depend upon the particular application and design of the overall system. Skilled artisans may implement the described functionality in varying ways for each particular application, but such implementation decisions should not be interpreted as causing a departure from the scope of the present disclosure. Skilled artisans will also recognize that the order or combination of components, methods, or interactions that are described herein are illustrative and that the components, methods, or interactions of the various aspects of the disclosure may be combined or performed in ways other than those illustrated and described herein.

A hardware and data processing apparatus used to implement the various illustrative logics, logical blocks, modules and circuits described in connection with the aspects disclosed herein may be implemented or performed with a single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor may be a microprocessor, controller, microcontroller, state machine, or other type of processor. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, a data processing apparatus.

If implemented in software, the functions may be stored on or transmitted over as one or more instructions or code on a computer-readable medium. The processes of a method or process disclosed herein may be implemented in a processor-executable software module which may reside on a computer-readable medium. Computer-readable media includes computer storage media. A storage media may include media accessible by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or process may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication by a user equipment (UE), the apparatus comprising:

a transmitter; and a receiver configured to:

receive a first downlink control information (DCI) message associated with a first stage of a multi-stage DCI transmission; and receive a second DCI message associated with a second stage of the multi-stage DCI transmission, wherein the multi-stage DCI transmission is associated with an overbooking restriction indicating a maximum quantity of blind decode operations associated with one or more stages of the multi-stage DCI transmission.

2. The apparatus of claim 1, wherein the maximum quantity of the blind decode operations is applicable to the first stage and is inapplicable to the second stage, and wherein the receiver is further configured to receive the first DCI message using a first quantity of the blind decode operations that is less than or equal to the maximum quantity.

3. The apparatus of claim 1, wherein the maximum quantity is jointly applicable to the first stage and to the second stage, wherein the receiver is further configured to receive the first DCI message using a first quantity of the blind decode operations that is less than or equal to a first maximum quantity and to receive the second DCI message using a second quantity of the blind decode operations that is less than or equal to a second maximum quantity, and wherein the maximum quantity corresponds to a sum of the first quantity and the second quantity.

4. The apparatus of claim 1, wherein the maximum quantity is separately applicable to the first stage and to the second stage, and wherein the receiver is further configured to receive the first DCI message using a first quantity of the blind decode operations that is less than or equal to the maximum quantity and to receive the second DCI message using a second quantity of the blind decode operations that is less than or equal to the maximum quantity.

5. The apparatus of claim 1, wherein the first stage of the multi-stage DCI transmission is associated with a first priority that is greater than a second priority associated with a single-stage DCI (sDCI) transmission.

6. The apparatus of claim 1, wherein the maximum quantity is less than or equal to a sum of a plurality of maximum quantities respectively associated with a plurality of component carriers (CCs) associated with the multi-stage DCI transmission.

7. The apparatus of claim 6, wherein at least one CC of the plurality of CCs is unscheduled for wireless communication associated with the UE during the multi-stage DCI transmission, and wherein the maximum quantity is based at least in part on one or more blind decode operations associated with the at least one CC.

8. The apparatus of claim 1, wherein the first DCI message indicates scheduling information associated with the second DCI message, and wherein the receiver is further configured to receive the second DCI message using the scheduling information and a physical downlink control channel (PDCCH) candidate without counting control channel elements (CCEs) of the PDCCH candidate toward the maximum quantity.

9. A method of wireless communication by a user equipment (UE), the method comprising:
- receiving a first downlink control information (DCI) message associated with a first stage of a multi-stage DCI transmission; and
- receiving a second DCI message associated with a second stage of the multi-stage DCI transmission,
- wherein the multi-stage DCI transmission is associated with an overbooking restriction indicating a maximum quantity of blind decode operations associated with one or more stages of the multi-stage DCI transmission.

10. The method of claim 9, wherein the maximum quantity of the blind decode operations is applicable to the first stage and is inapplicable to the second stage, and wherein the first DCI message is received using a first quantity of the blind decode operations that is less than or equal to the maximum quantity.

11. The method of claim 9, wherein the maximum quantity is jointly applicable to the first stage and to the second stage, wherein the first DCI message is received using a first quantity of the blind decode operations that is less than or equal to a first maximum quantity, wherein the second DCI message is received using a second quantity of the blind decode operations that is less than or equal to a second maximum quantity, and wherein the maximum quantity corresponds to a sum of the first quantity and the second quantity.

12. The method of claim 9, wherein the maximum quantity is separately applicable to the first stage and to the second stage, wherein the first DCI message is received using a first quantity of the blind decode operations that is less than or equal to the maximum quantity, and wherein the second DCI message is received using a second quantity of the blind decode operations that is less than or equal to the maximum quantity.

13. The method of claim 9, wherein the first stage of the multi-stage DCI transmission is associated with a first priority that is greater than a second priority associated with a single-stage DCI (sDCI) transmission.

14. The method of claim 9, wherein the maximum quantity is less than or equal to a sum of a plurality of maximum quantities respectively associated with a plurality of component carriers (CCs) associated with the multi-stage DCI transmission.

15. The method of claim 14, wherein at least one CC of the plurality of CCs is unscheduled for wireless communication associated with the UE during the multi-stage DCI transmission, and wherein the maximum quantity is based at least in part on one or more blind decode operations associated with the at least one CC.

16. The method of claim 9, wherein the first DCI message indicates scheduling information associated with the second DCI message, and wherein the second DCI message is received using the scheduling information and a physical downlink control channel (PDCCH) candidate without counting control channel elements (CCEs) of the PDCCH candidate toward the maximum quantity.

17. An apparatus for wireless communication by a network node, the apparatus comprising:
- a receiver; and
- a transmitter configured to:
  - transmit a first downlink control information (DCI) message associated with a first stage of a multi-stage DCI transmission; and
  - transmit a second DCI message associated with a second stage of the multi-stage DCI transmission,
- wherein the multi-stage DCI transmission is associated with an overbooking restriction indicating a maximum quantity of blind decode operations associated with one or more stages of the multi-stage DCI transmission.

18. The apparatus of claim 17, wherein the maximum quantity of the blind decode operations is applicable to the first stage and is inapplicable to the second stage.

19. The apparatus of claim 17, wherein the maximum quantity is jointly applicable to the first stage and to the second stage.

20. The apparatus of claim 17, wherein the maximum quantity is separately applicable to the first stage and to the second stage.

* * * * *